(12) United States Patent
Kim et al.

(10) Patent No.: US 9,807,720 B2
(45) Date of Patent: Oct. 31, 2017

(54) METHOD AND APPARATUS FOR RECEIVING CONTROL INFORMATION OF DEVICE-TO-DEVICE UE IN WIRELESS COMMUNICATION SYSTEM

(71) Applicant: LG ELECTRONICS INC., Seoul (KR)

(72) Inventors: Kijun Kim, Seoul (KR); Hanbyul Seo, Seoul (KR); Suckchel Yang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/113,409

(22) PCT Filed: Apr. 30, 2015

(86) PCT No.: PCT/KR2015/004413
§ 371 (c)(1),
(2) Date: Jul. 21, 2016

(87) PCT Pub. No.: WO2015/167286
PCT Pub. Date: Nov. 5, 2015

(65) Prior Publication Data
US 2017/0013580 A1    Jan. 12, 2017

Related U.S. Application Data

(60) Provisional application No. 61/986,117, filed on Apr. 30, 2014.

(51) Int. Cl.
*H04W 72/00* (2009.01)
*H04W 56/00* (2009.01)
(Continued)

(52) U.S. Cl.
CPC ......... *H04W 56/0025* (2013.01); *H04L 47/17* (2013.01); *H04W 56/00* (2013.01);
(Continued)

(58) Field of Classification Search
USPC ......................................................... 455/451
See application file for complete search history.

(56) References Cited

U.S. PATENT DOCUMENTS

2012/0224546 A1    9/2012   Chang et al.

FOREIGN PATENT DOCUMENTS

KR    10-2013-0029355    3/2013

OTHER PUBLICATIONS

LG Electronics, "Discussion on D2D Synchronization Procedure," 3GPP TSG-RAN WG1 #76, R1-140330, Feb. 2014, 7 pages.
(Continued)

*Primary Examiner* — Joel Ajayi
(74) *Attorney, Agent, or Firm* — Lee, Hong, Degerman, Kang & Waimey PC

(57) ABSTRACT

According to one embodiment of the present invention, a method for receiving device-to-device (D2D) control information at a user equipment (UE) in a wireless communication system, the method comprising receiving a subframe; receiving a D2D synchronization signal sequence transmitted on the subframe; deciding a hop count of the D2D synchronization signal sequence from an index of the D2D synchronization signal sequence; deciding a transmission location of D2D control information corresponding to the decided hop count; and receiving the D2D control information at the decided transmission location.

11 Claims, 12 Drawing Sheets

(a)

(b)

(51) Int. Cl.
*H04L 12/801* (2013.01)
*H04W 72/12* (2009.01)
*H04L 27/26* (2006.01)
*H04W 88/06* (2009.01)

(52) U.S. Cl.
CPC ..... *H04W 72/1215* (2013.01); *H04L 27/2601* (2013.01); *H04W 88/06* (2013.01)

(56) References Cited

OTHER PUBLICATIONS

LG Electronics, "On the Design of D2DSS and PD2DSCH," 3GPP TSG-RAN WG1 #76, R1-140329, Feb. 2014, 6 pages.
PCT International Application No. PCT/KR2015/004413, Written Opinion of the International Searching Authority dated Aug. 12, 2015, 9 pages.

FIG.10
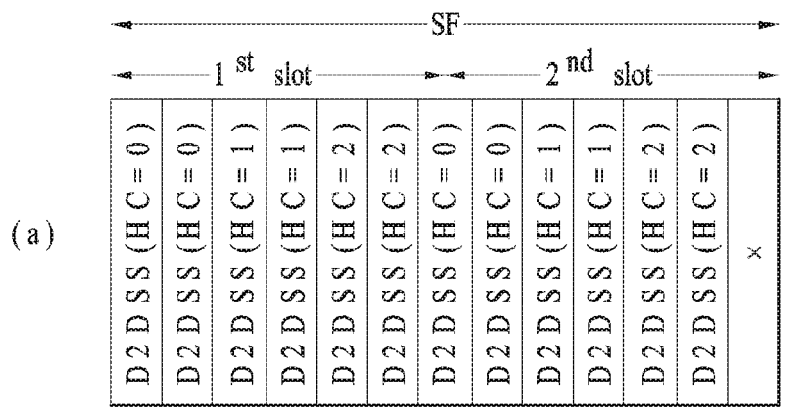
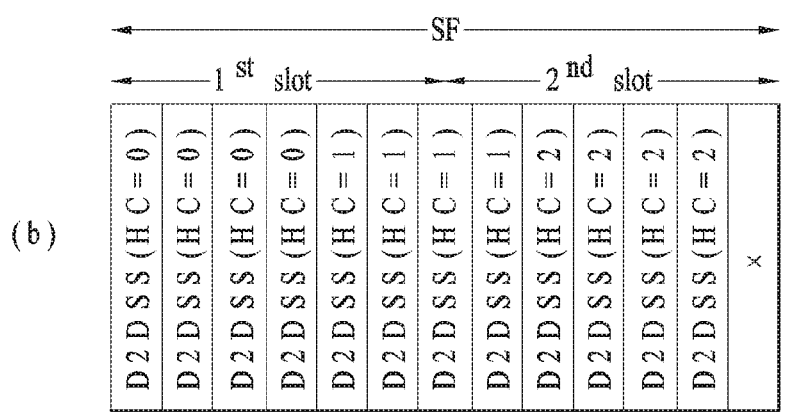
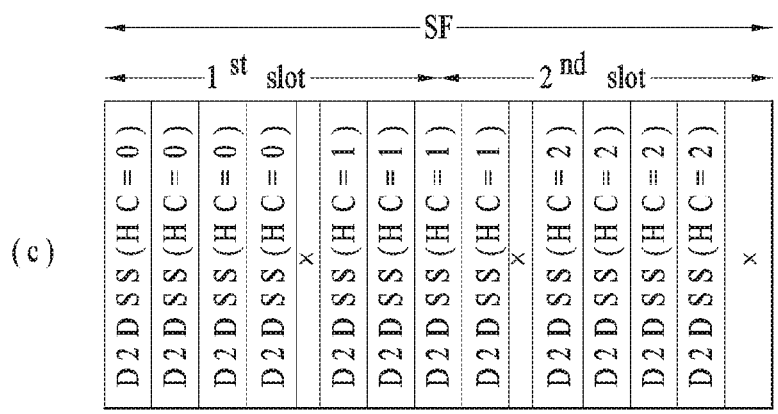

FIG.13
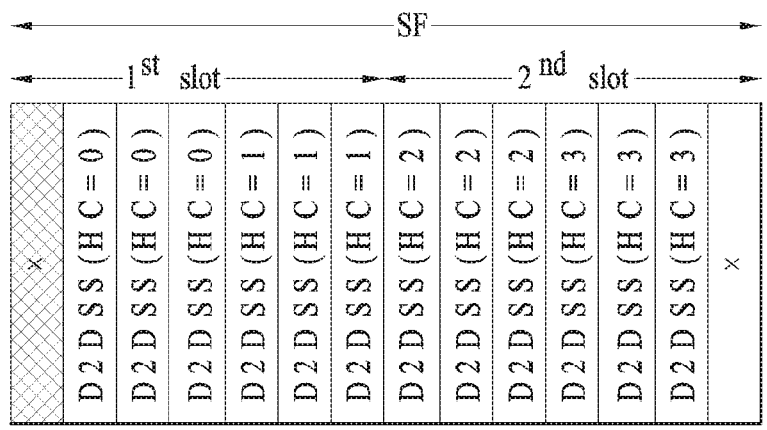
(a)
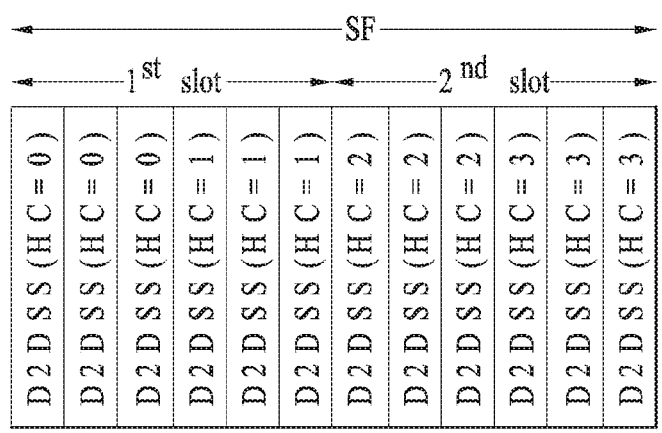
(b)

METHOD AND APPARATUS FOR RECEIVING CONTROL INFORMATION OF DEVICE-TO-DEVICE UE IN WIRELESS COMMUNICATION SYSTEM

CROSS-REFERENCE TO RELATED APPLICATIONS

This application is the National Stage filing under 35 U.S.C. 371 of International Application No. PCT/KR2015/004413, filed on Apr. 30, 2015, which claims the benefit of U.S. Provisional Application No. 61/986,117, filed on Apr. 30, 2014, the contents of which are all hereby incorporated by reference herein in their entirety.

TECHNICAL FIELD

The following description relates to a wireless communication system and, more particularly, to a method and apparatus for receiving control information in device-to-device communication.

BACKGROUND ART

Wireless communication systems have been diversified in order to provide various types of communication services such as voice or data service. In general, a wireless communication system is a multiple access system capable of sharing available system resources (bandwidth, transmit power or the like) so as to support communication among multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system a Multi Carrier Frequency Division Multiple Access (MC-FDMA) system and the like.

Device-to-device (D2D) communication refers to a communication scheme for establishing a direct link between user equipments (UEs) and directly exchanging voice, data, etc. between the UEs without intervention of an evolved NodeB (eNB). D2D communication may include UE-to-UE communication, peer-to-peer communication, etc. In addition, the D2D communication scheme is applicable to machine-to-machine (M2M) communication, machine type communication (MTC), etc.

D2D communication has been considered as a method for solving burdens of an eNB due to rapid increase in data traffic. For example, in D2D communication, since data is exchanged between devices unlike an existing wireless communication system, network overload may be reduced. In addition, by introducing D2D communication, decrease in number of procedures performed in an eNB, decrease in power consumption of devices participating in D2D, increase in data transfer rate, increase in network capacity, load distribution, cell coverage enlargement, etc. may be achieved.

DISCLOSURE

Technical Problem

An object of the present invention devised to solve the problem lies in transmission of a D2D synchronization signal and a D2D control signal and multiplexing of D2D synchronization signals.

The technical problems solved by the present invention are not limited to the above technical problems and other technical problems which are not described herein will become apparent to those skilled in the art from the following description.

Technical Solution

According to one embodiment of the present invention, a method for receiving device-to-device (D2D) control information at a user equipment (UE) in a wireless communication system, the method comprising receiving a subframe; receiving a D2D synchronization signal sequence transmitted on the subframe; deciding a hop count of the D2D synchronization signal sequence from an index of the D2D synchronization signal sequence; deciding a transmission location of D2D control information corresponding to the decided hop count; and receiving the D2D control information at the decided transmission location.

According to a different embodiment of the present invention, a user equipment (UE) apparatus for transmitting a device-to-device (D2D) signal in a wireless communication system, the UE apparatus comprising: a receive module; and a processor, wherein the processor receives a D2D synchronization signal sequence transmitted on a received subframe, decides a hop count of the D2D synchronization signal sequence from an index of the D2D synchronization signal sequence, decides a transmission location of D2D control information corresponding to the decided hop count, and receives the D2D control information at the decided transmission location.

The D2D control information corresponding to the hop count is transmitted by a UE which has transmitted the D2D synchronization signal sequence used to decide the hop count.

Time relationship between a subframe, on which the hop count is transmitted, and a subframe, on which the D2D control information is transmitted, is predetermined.

The transmission location of the D2D synchronization signal sequence in the subframe is set according to the hop count.

D2D synchronization signal sequences having different hop counts are time-divisionally multiplexed in the subframe.

A smallest value of hop counts of D2D synchronization signal sequences included in the subframe varies depending on whether the UE is an out-of-coverage UE.

If the UE is an out-of-coverage UE, the hop count decided from the D2D synchronization signal sequences included in the subframe includes 0.

A largest value of hop counts decided from D2D synchronization signal sequences included in the subframe if the UE is an out-of-coverage UE is less than a largest value of hop counts decided from D2D synchronization sequences included in the subframe if the UE is an in-coverage UE.

The D2D synchronization signal sequence is transmitted via three OFDM symbols in the subframe.

The number of hop counts found in the subframe is 3.

If a transmission period of the subframe, on which the D2D synchronization signal sequence is transmitted, is predetermined, the UE transmits the D2D synchronization signal sequence once more within the transmission period.

The D2D synchronization signal sequence transmitted once more is transmitted on a next subframe of the subframe, on which the D2D control information corresponding to a last hop count found in the subframe is transmitted.

A time-frequency correction value of a synchronization signal of the UE is applied to the D2D synchronization signal sequence transmitted once more.

Advantageous Effects

According to the embodiment of the present invention, a UE can receive D2D control information corresponding to each hop without separate signaling if a D2D synchronization signal is relayed.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings:

FIGS. 9 to 11 are diagrams illustrating multiplexing of D2D synchronization signals according to an embodiment of the present invention;

FIGS. 12 to 13 are diagrams illustrating transmission of a non-hierarchical synchronization signal according to an embodiment of the present invention.

BEST MODE

Figure 1:
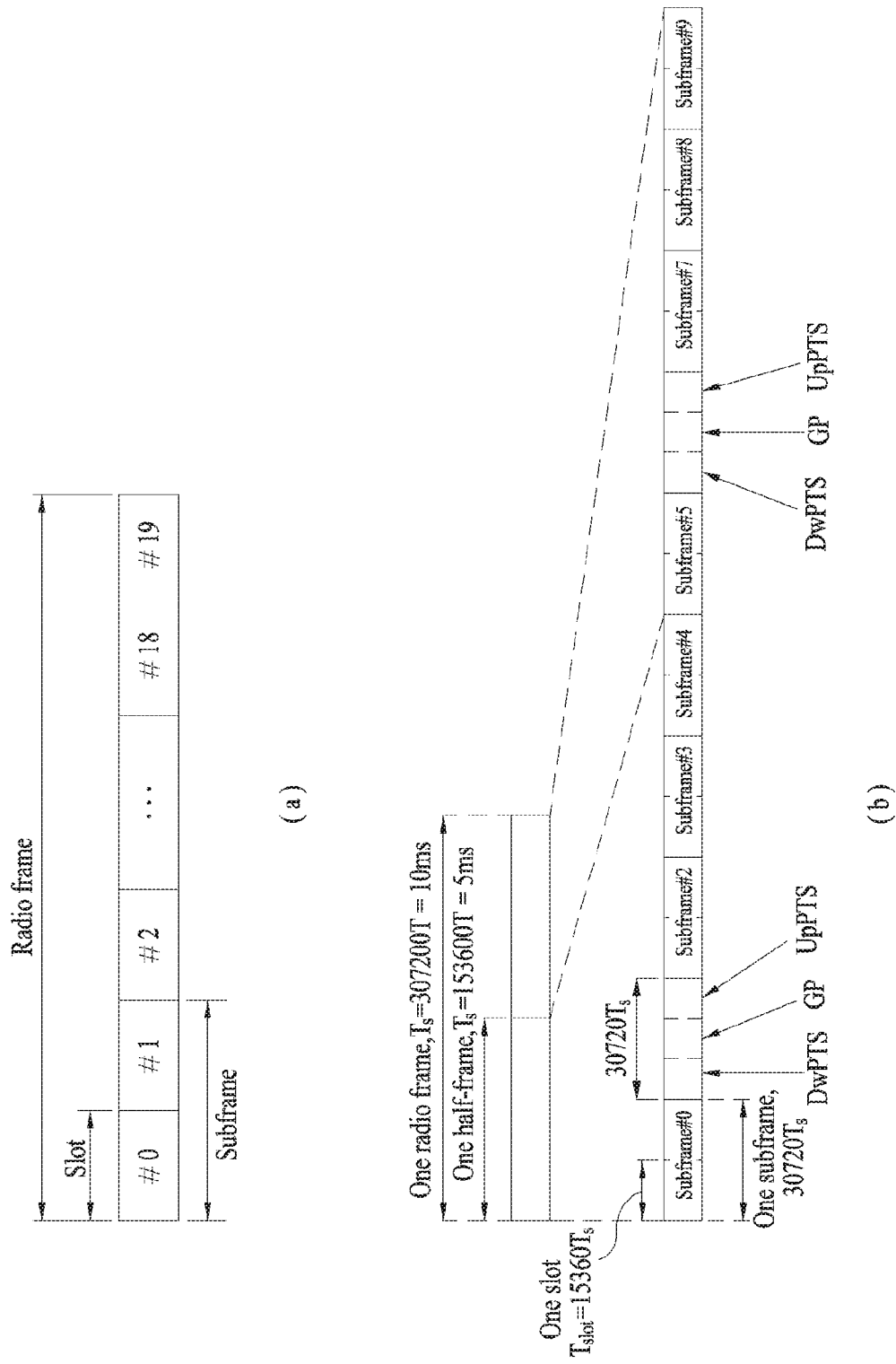
FIG. 1 is a diagram showing the structure of a radio frame.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)". It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
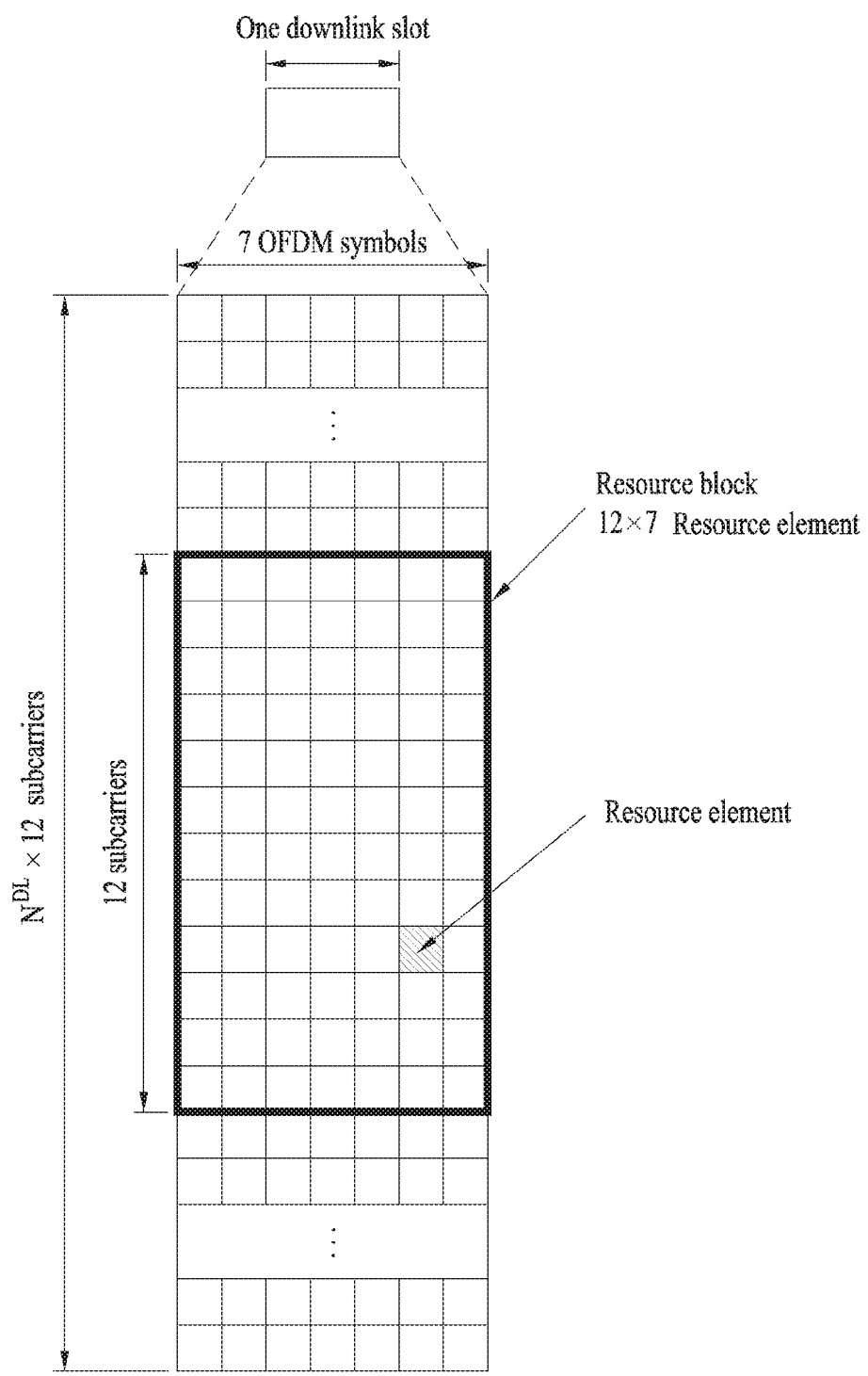
FIG. 2 is a diagram showing a resource grid in a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12*7 REs. The number $N_{DL}$ of RBs included in a downlink slot depends on a DL transmission bandwidth. A UL slot may have the same structure as a DL slot.

Figure 3:
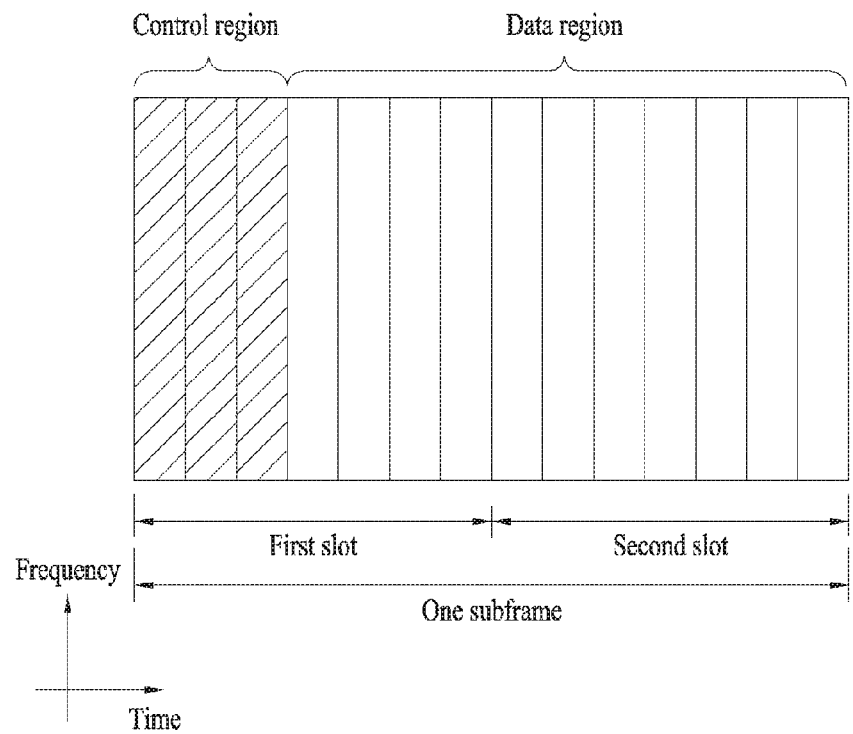
FIG. 3 is a diagram showing the structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
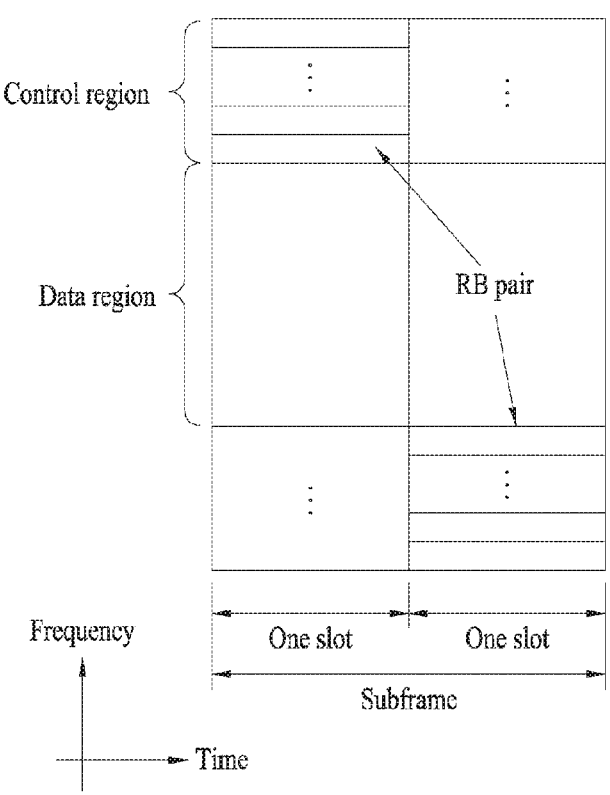
FIG. 4 is a diagram showing the structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Synchronization Acquisition of D2D UE

Figure 5:
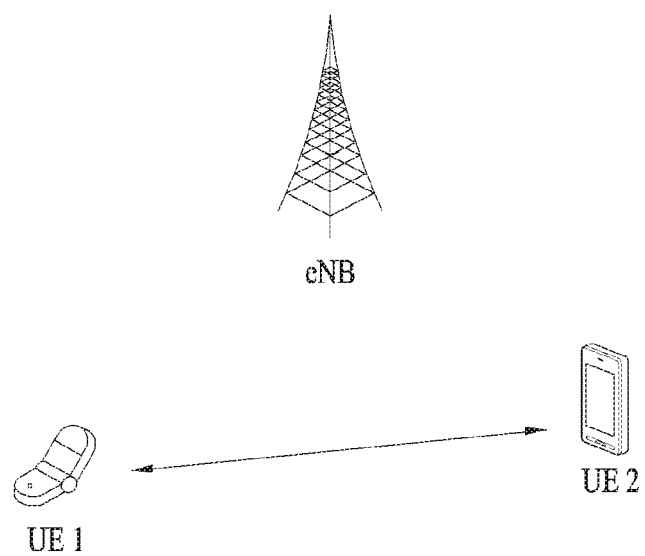
FIGS. 5 to 6 are diagrams illustrating relay of a synchronization signal in D2D communication.

FIG. 5 shows an example of D2D communication performed between UEs using a direct wireless channel. The two UEs need to perform synchronization in order to transmit and receive a D2D signal. A UE (or an eNB; a UE means the terminal of a user but a network apparatus such as an eNB may also be regarded as a UE when transmitting and receiving a signal according to a communication scheme between UEs) may transmit a D2D synchronization signal (D2DSS). The D2DSS includes a primary D2D synchronization signal (PD2DSS) and a secondary D2D synchronization signal (SD2DSS). A reception UE may blind-detect a synchronization signal and detect time synchronization and frequency synchronization. In an existing LTE system, synchronization signals (PSS and SSS) transmitted by an eNB are transmitted in a period of 5 ms and synchronization signals of several subframes are combined to accumulate energy, thereby detecting synchronization. In contrast, in D2D communication, since frequent synchronization signal transmission occupies excessive resources and consumes the battery of the UE, the synchronization signal is preferably transmitted infrequently. In particular, when the UE detects the synchronization signal, synchronization is generally maintained for 500 ms and the transmission period of the D2DSS may be a maximum of several hundreds of ms. Hereinafter, although the D2DSS is assumed as being transmitted with a period of 100 ms, the scope of the present invention is not limited to a specific period such as 100 ms.

Figure 6:
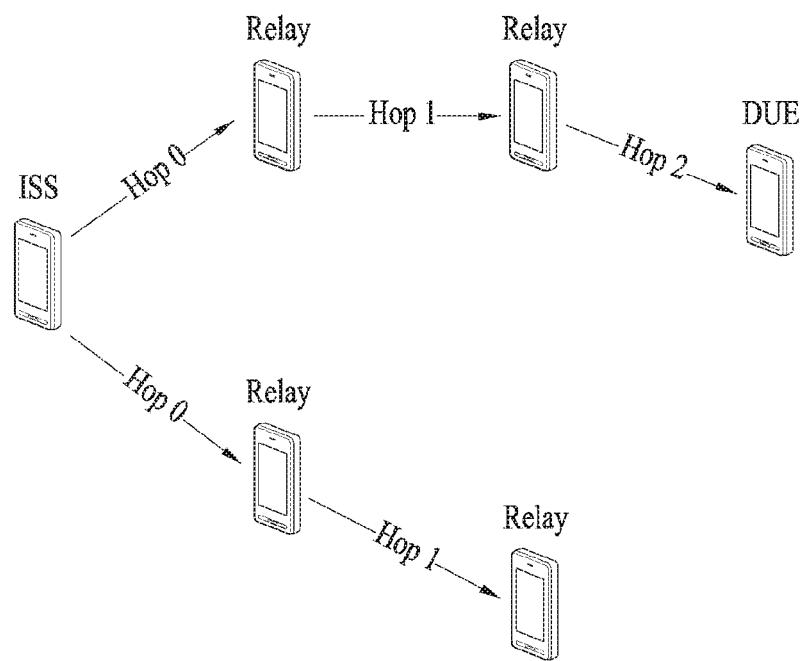

In an out-of-coverage environment, a UE for independently deciding a D2DSS transmission time is referred to as an independent synchronization source (ISS) UE and a UE, which has received a D2DSS from the ISS, may relay the D2DSS in order to perform D2D communication with another UE. FIG. 6 shows an example of relaying a D2DSS. As shown in FIG. 6, a UE for transmitting a PD2DSS of a hop count n may deduce the transmission time of the PD2DSS from the reception time of a PD2DSS of a hop count (n−1).

In an in-coverage environment, an ISS may be an eNB and a UE for transmitting a PD2DSS of a hop count 1 may deduce the transmission time of the PD2DSS from the reception time of a synchronization signal (PSS/SSS) transmitted by the eNB.

Although an area using the same transmission time may be increased via relay of a PD2DSS to efficiently perform a synchronization maintenance process in D2D communication between UEs, transmission time and frequency errors may be added whenever the PD2DSS is relayed. That is, as the hop count increases, errors may be accumulated. Therefore, the maximum hop count of the relayed PD2DSS may be restricted.

UEs synchronized via a D2DSS may transmit and receive D2D control information. Here, the D2D control information indicates basic information (e.g., channel bandwidth, D2D subframe information and resource pool, etc.) used for D2D communication and turbo coding or convolutional coding may be used for data payload. D2D control information may be transmitted via a physical D2D synchronization channel (PD2DSCH). The PD2DSCH is exemplary and thus may be understood as a channel for transmitting D2D control information.

Hereinafter, relay of a D2DSS and a method for transmitting a PD2DSCH will be described.

Transmission of D2DSS and PD2DSCH

According to one embodiment of the present invention, a PD2DSCH may be linked to a transmission location of a D2DSS. From the viewpoint of a UE which receives a D2DSS, the UE may receive a subframe and then receive a D2D synchronization signal sequence included in the subframe. The UE may decide the hop count of the D2D synchronization signal sequence from the index of the D2D synchronization signal sequence (in this case, it is assumed that the D2D synchronization signal sequence varies according to hop count). The transmission location of the PD2DSCH corresponding to the hop count may be decided and the PD2DSCH may be received at the decided transmission location. Here, the PD2DSCH corresponding to the hop count may be transmitted by a UE, which has transmitted a D2D synchronization signal sequence for deciding the hop count.

Figure 7:
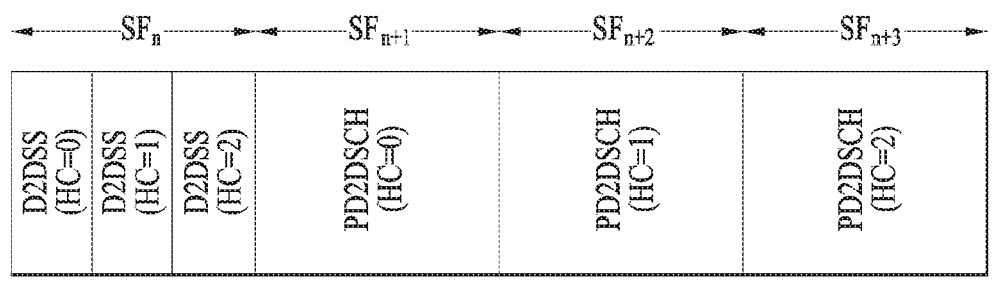
FIGS. 7 to 8 are diagrams illustrating transmission of a D2D synchronization signal and a D2D control signal according to an embodiment of the present invention.

In the above-described subframe, D2D synchronization signal sequences having different hop counts may be time-divisionally multiplexed. In the subframe, the transmission location of the D2D synchronization signal sequence may be set according to hop count. A time relationship between a subframe, on which D2D synchronization signal sequence with a hop count is transmitted, and a subframe, on which a PD2DSCH is transmitted, may be predetermined. This example is shown in FIG. 7. In FIG. 7, assume that the number of hop counts found in the subframe is 3 and the PD2DSCH is transmitted on one subframe. D2D synchronization signal sequence may be transmitted via four OFDM symbols in a subframe, Referring to FIG. 7, D2D synchronization signals corresponding to hop counts 0, 1 and 2 are subjected to TDM in a subframe n (SF n). The PD2DSCHs corresponding to hop counts 0, 1 and 2 are transmitted on subframes n+1, n+2 and n+3, respectively. In FIG. 7, in a relationship between the transmission times (subframes) of the hop counts and the PD2DSCHs, the PD2DSCH corresponding to a hop count n may be pre-set to be transmitted on an n-th subframe after a subframe, on which the D2DSS is transmitted. The UE, which has received the D2DSS, knows the relationship between the transmission locations of the hop counts and the PD2DSCHs and can accurately receive the PD2DSCHs.

If the D2DSS does not vary according to hop count, that is, if the same D2DSS sequence is used for hop counts, the hop count cannot be confirmed by the detected D2DSS. In this case, PD2DSCH decoding may be attempted at a plurality of locations determined relative to the detected D2DSS locations and the hop count may be confirmed by a difference between the detected D2DSS locations and the decoded PD2DSCH locations. In FIG. 7, the difference between the transmission start time of the D2DSS and the transmission start time of the PD2DSCH is one subframe if the hop count is 0, is 5/3 subframe if the hop count is 1 and is 7/3 subframe if the hop count is 2. Therefore, when the D2DSS is detected, the UE may perform blind detection/decoding to determine whether the PD2DSCHs are transmitted after 1, 5/3 and 7/3 subframes from the start point of the D2DSS and decide the hop counts of the D2DSSs and the PD2DSCHs depending on when the PD2DSCHs are detected.

Figure 8:
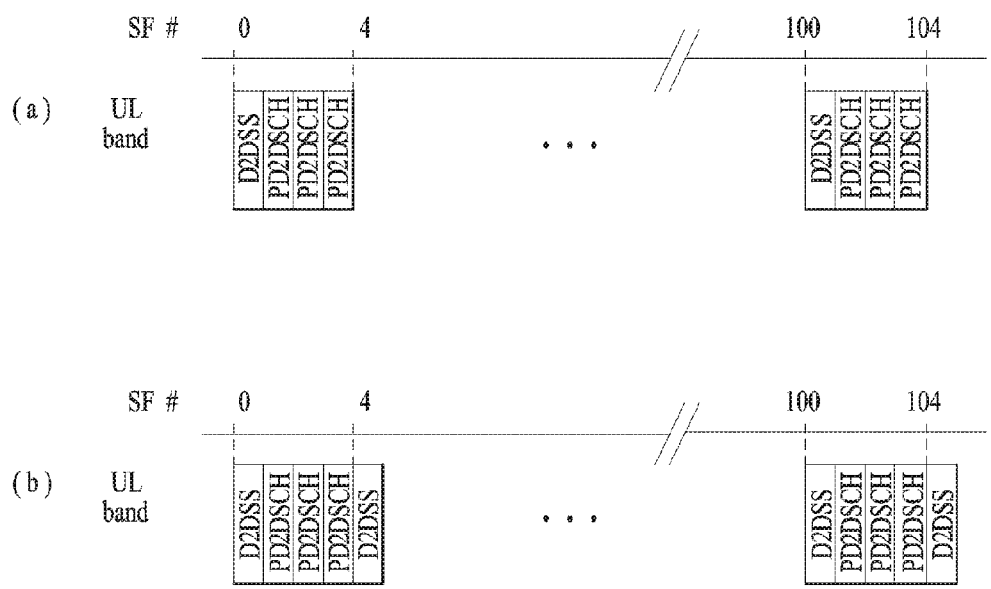

When the transmission period of the subframe, on which the D2D synchronization signal sequence is transmitted, is predetermined, the UE may transmit the D2D synchronization signal sequence once more within the transmission period. Here, the D2D synchronization signal sequence transmitted once more may be transmitted on a next subframe of the transmission subframe of the PD2DSCH corresponding to a last hop count found in the subframe and a time-frequency correction value of the synchronization signal of the UE is applicable to the D2D synchronization signal sequence transmitted once more. This example is shown in FIG. 8. More specifically, as shown in FIG. 8(a), when the transmission period of the subframe, on which the D2D synchronization signal sequence is transmitted, is set to 100 ms, as shown in FIG. 8(b), the D2D synchronization signal sequence may be transmitted once more within the period. By such a configuration, it is possible to reduce errors which may occur in synchronization signal relay. More specifically, the UE, which has transmitted the D2DSS, receives the D2DSS of a hop count n−1 in a 0-th D2DSS subframe to correct time and frequency synchronization. However, a processing time is insufficient to transmit the D2DSS of a hop count n according to the corrected result on a $0^{th}$ D2DSS subframe. In this case, the time and frequency correction value obtained by receiving the D2DSS of the hop count n−1 on the $0^{th}$ D2DSS subframe is applied when the D2DSS of the hop count n is transmitted on a $100^{th}$ D2DSS subframe to increase accumulated time/frequency errors according to increase in hop count. Accordingly, as described above, the D2D synchronization signal sequence is transmitted once more within the D2DSS transmission period, thereby solving such problem.

The smallest value of the hop counts of the D2D synchronization signal sequences included in the subframe may vary depending on whether the UE is an out-of-coverage UE. For example, the largest value of the hop counts decided from the D2D synchronization signal sequences included in the subframe if the UE is an out-of-coverage UE may be less than the largest value of the hop counts decided from the D2D synchronization signal sequences included in the subframe if the UE is an in-coverage UE. In the in-coverage environment, a synchronization signal of an eNB functions as an ISS and thus a D2DSS of hop count 0 is not transmitted. Accordingly, at a D2DSS transmission location of a hop count n in the out-of coverage environment, a D2DSS of a hop count n+1 may be transmitted in the in-coverage environment. Resources used to transmit the D2DSS of a specific hop count may be different in the out-of coverage environment and the in-coverage environment. That is, an OFDM symbol of a subframe on which a D2DSS is transmitted may be differently set in the out-of-coverage environment and the in-coverage environment.

In the out-of-coverage environment, only one subframe is assigned to the D2DSS per D2DSS transmission period and the D2DSS of a specific hop count is transmitted via three OFDM symbols, D2DSSs of up to a hop count 2 may be maximally transmitted. By assigning two subframes to the D2DSS per D2DSS transmission period, D2DSS of up to a hop count N−1 from a hop count 0 may be transmitted on a first subframe and D2DSS of up to a hop count 2N−1 from a hop count N may be transmitted on a second subframe. In this case, D2DSSs of up to a hop count 2N−1 may be transmitted. That is, in the out-of-coverage environment, if D2DSSs of N hop counts are time-divisionally multiplexed and transmitted on one subframe and K subframes are assigned to D2DSSs per D2DSS transmission period, independent resources of a maximum of K*N D2DSSs are secured and a maximum hop count may become K*N−1.

In contrast, in the in-coverage environment, since the PD2DSS of the hop count 0 is not transmitted, the D2DSS of the hop count n+1 in the in-coverage environment may be transmitted at the D2DSS transmission location of the hop count n in the out-of-coverage environment. If the D2DSSs of N hop counts are time-divisionally multiplexed and transmitted on one subframe and K subframes are assigned to the D2DSS per D2DSS transmission period, independent resources of a maximum of K*N D2DSSs may be secured and a maximum hop count may become K*N.

Even when the same resources are assigned to D2DSSs, the maximum hop count may be differently set in the out-of-coverage environment and the in-coverage environment. That is, if K*N independent resources are assigned to D2DSSs, the maximum hop count of the out-of-coverage environment is K*N−1 and the maximum hop count of the in-coverage environment is K*N. Alternatively, the size of the resources assigned to the D2DSSs may be differently set in the out-of-coverage environment and the in-coverage environment, by differently setting the maximum hop count.

If the D2DSSs to be used in the out-of-coverage environment and the in-coverage environment are different, the UE may check whether the synchronization source is a UE or an eNB using the index of the detected D2DSS sequence. That is, the UE may check whether D2D communication is performed in the out-of-coverage environment or in the in-coverage environment. A gap between the transmission start time of the D2DSS and the transmission start time of the PD2DSCH may be differently set in the out-of-coverage environment and the in-coverage environment according to hop count. Therefore, the UE in a D2D initial synchronization process should perform blind detection/decoding using the index of the detected D2DSS to differently set the PD2DSCH reception start time.

Although D2DSSs corresponding to various hop counts are subjected to TDM and transmitted on one subframe in the above description, D2DSS TDM of FIG. 7 is exemplary. Hereinafter, various D2DSS TDM schemes will be described.

TDM of D2DSS

Figure 9:
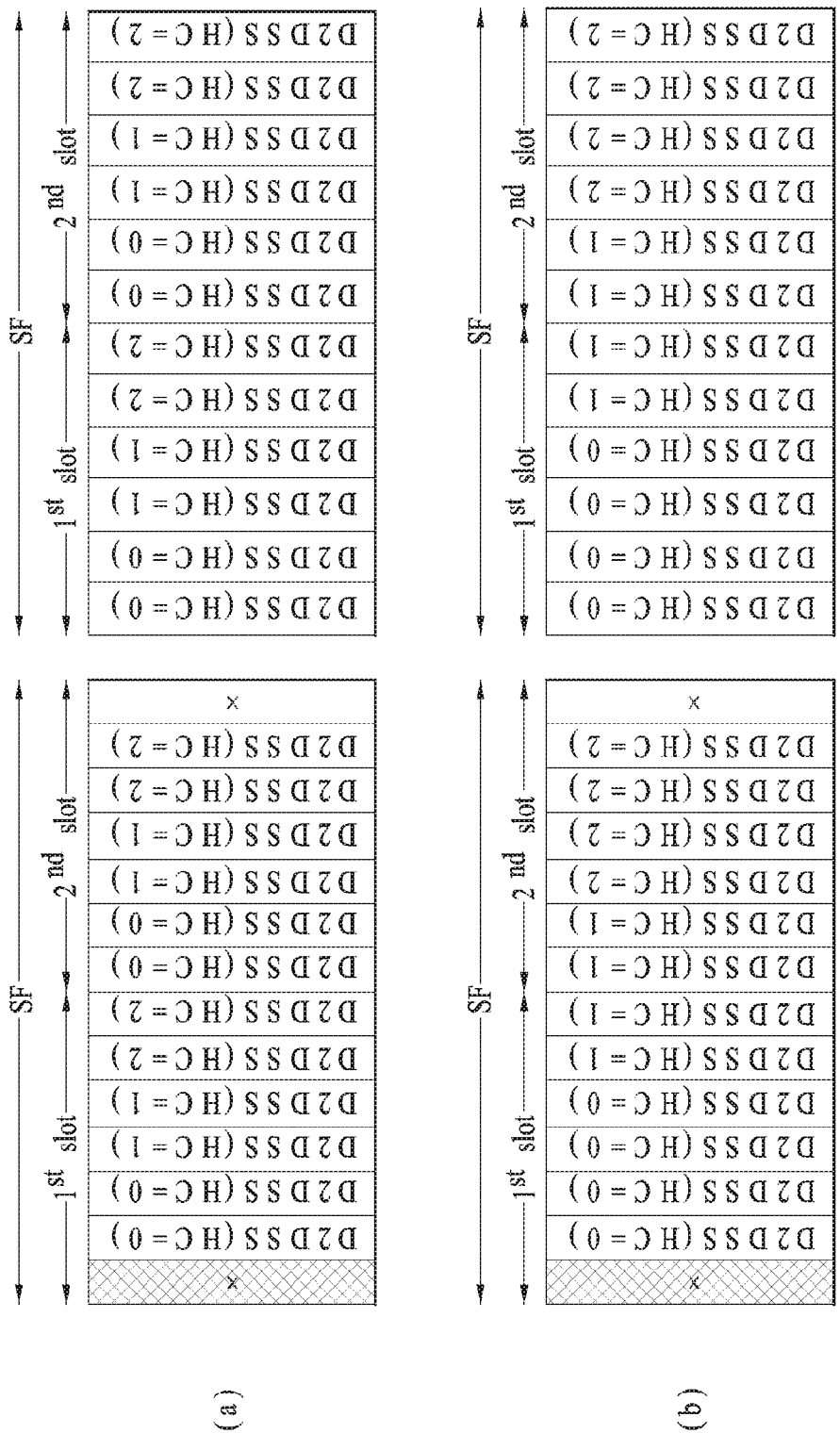
Figure 11:
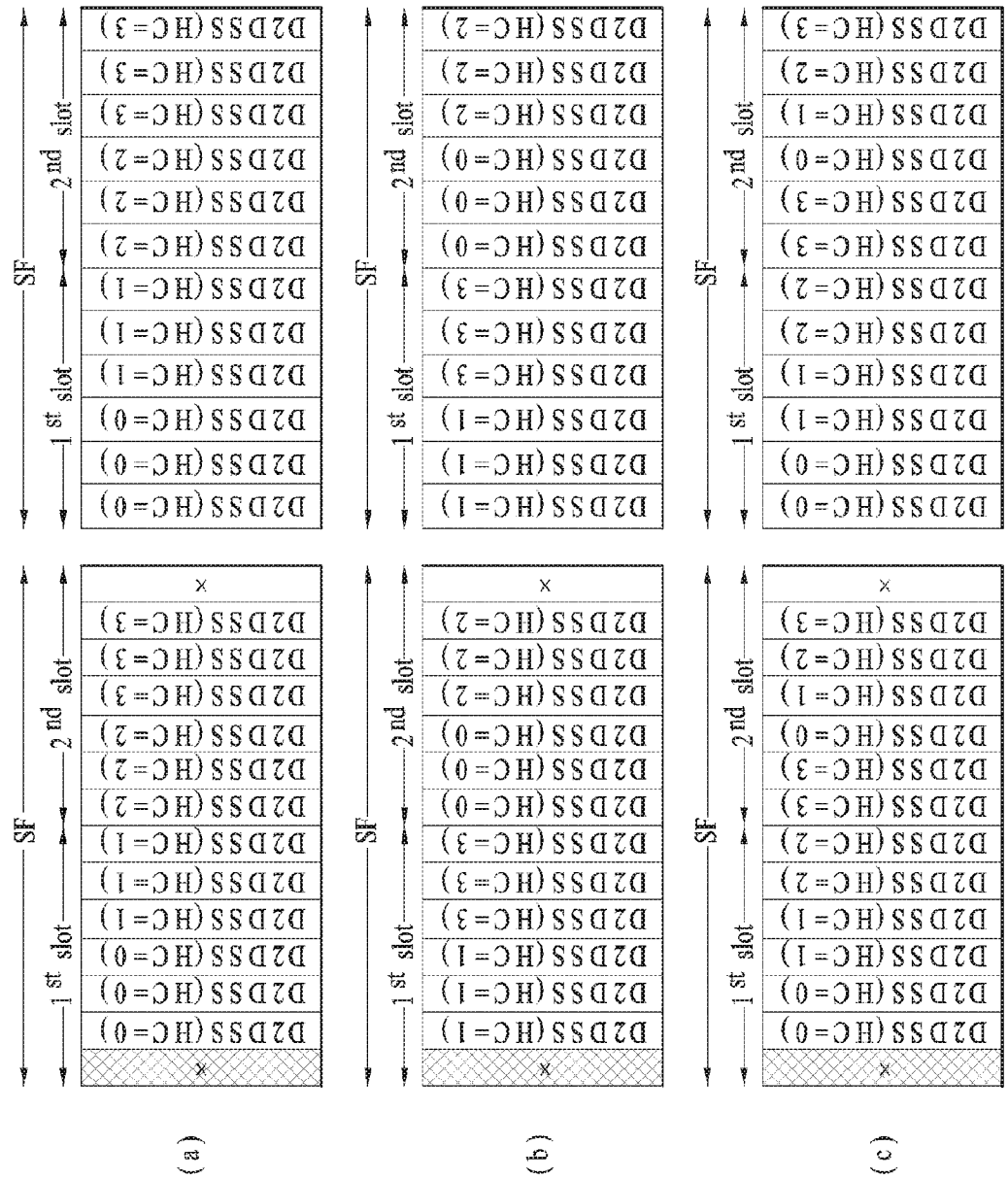

Various D2DSS TDM schemes according to the embodiment of the present invention are shown in FIGS. 9 to 11. As described above, D2DSSs transmitted from a plurality of UEs may be time-divisionally multiplexed within one subframe and the transmission locations of the D2DSSs may be decided within the subframe by the hop count.

FIG. 9 shows an example of time-divisionally multiplexing and transmitting D2DSSs corresponding to three hop counts in a subframe. The D2DSS of a specific hop count is transmitted using four OFDM symbols and D2DSSs corresponding to three hop counts are multiplexed in one subframe. The left of FIG. 9(a) shows the case in which 12 OFDM symbols except for first and last OFDM symbols at OFDM symbol locations of a normal CP subframe are used for D2DSSs. In this case, a gap corresponding to non-transmission may be given to start and last parts of the subframe, on which the D2DSSs are transmitted, to avoid interference due to collision with a previous subframe or a subsequent subframe. The right side of FIG. 9(a) shows an example in which all 12 OFDM symbols of a long CP subframe are for D2DSSs.

In FIG. 9, the D2DSS of each hop count is transmitted using four OFDM symbols, first and second D2DSSs are transmitted via consecutive OFDM symbols, third and fourth D2DSSs are transmitted via consecutive OFDM symbols after a predetermined time. Such a structure may enable estimation of a large frequency offset by a reception phase difference between first and second D2DSSs and a reception phase difference between third and fourth D2DSSs and estimation of a fine frequency offset by a reception phase difference between first and third D2DSSs and a reception phase difference between second and fourth D2DSSs. In a process in which an unsynchronized UE receives an initial D2DSS for synchronization, all D2DSSs of each hop count transmitted via a plurality of OFDM symbols may be received on a D2DSS subframe to increase a detection probability by energy combination. In the synchronization acquisition process of the right side of FIG. 9(a), the UE receives the D2DSS of each hop count via four OFDM symbols on the D2DSS subframe. However, the UE for transmitting the D2DSS corresponding to the hop count n receives only some signals by a Tx/Rx switching gap when receiving the D2DSS corresponding to a hop count n−1 or n+1. The UE for transmitting the D2DSS corresponding to the hop count 1 does not receive a part of the D2DSS of the hop count 0 transmitted on a second OFDM symbol and an eighth OFDM symbol by a Tx/Rx switching gap when receiving the D2DSS corresponding to the hop count 0. However, since the UE is in a synchronization maintenance process, the UE may maintain synchronization with energy less than reception signal energy necessary for the synchronization acquisition process.

FIG. 9(b) shows an example of transmitting the D2DSS of each hop count using four consecutive OFDM symbols. As compared to FIG. 9(a), precise frequency error correction capability is decreased, but a part which is not received by a Tx/Rx switching gap when the UE for transmitting the D2DSS corresponding to the hop count n receives the D2DSS corresponding to the hop count n−1 or n+1 is decreased.

Since the sizes of the gaps of a start part and a last part of a subframe necessary to avoid interference due to collision with a previous or subsequent subframe of a subframe, on which a D2DSS is transmitted, may be different, a transmission start time of the D2DSS may be set differently from an OFDM symbol start time of a normal CP subframe or long CP subframe of an existing LTE system. FIGS. 10(a) and 10(b) show examples of setting a non-transmission gap only in a last part of a subframe and divisionally transmitting 12 D2DSSs in the remaining time. In addition, in order to solve a problem that some signals are not received by a Tx/Rx switching gap when the UE for transmitting a D2DSS corresponding to a hop count n receives a D2DSS corresponding to a hop count n−1 or n+1, as shown in FIG. 10(c), a non-transmission gap may be added between the D2DSSs of different hop counts.

FIG. 11 shows an example of time-divisionally multiplexing D2DSSs corresponding to four hop counts in a subframe. A D2DSS of a specific hop count is transmitted using three OFDM symbols and the D2DSSs corresponding to the four hop counts are multiplexed in one subframe. The left side of FIG. 11(a) shows the case in which 12 OFDM symbols except for first and last OFDM symbols of a normal CP subframe are used for the D2DSSs and the right side of FIG. 11(a) shows the case in which all 12 OFDM symbols of a long CP subframe are used for the D2DSSs.

FIG. 11(b) shows an example in which D2DSSs are arranged in order of a hop count 1, a hop count 3, a hop count 0 and a hop count 2. By this configuration, it is possible to solve a problem that some signals are not received by a Tx/Rx switching gap when a UE for transmitting a D2DSS corresponding to a hop count n receives a D2DSS corresponding to a hop count n−1 or n+1.

FIG. 11(c) shows a structure in which first and second D2DSSs are transmitted via consecutive OFDM symbols and a third D2DSS is transmitted after a predetermined time. Such a structure may enable estimation of a large frequency offset by a reception phase difference between first and second D2DSSs and enable estimation of a fine frequency offset by a reception phase difference between second and third D2DSSs. In such a method, a gap between second and third D2DSSs varies according to hop count. Therefore, it is possible to acquire D2DSS signals via the first and second D2DSSs. The reception UE may determine a hop count via the transmission location of the third D2DSS.

Figure 12:
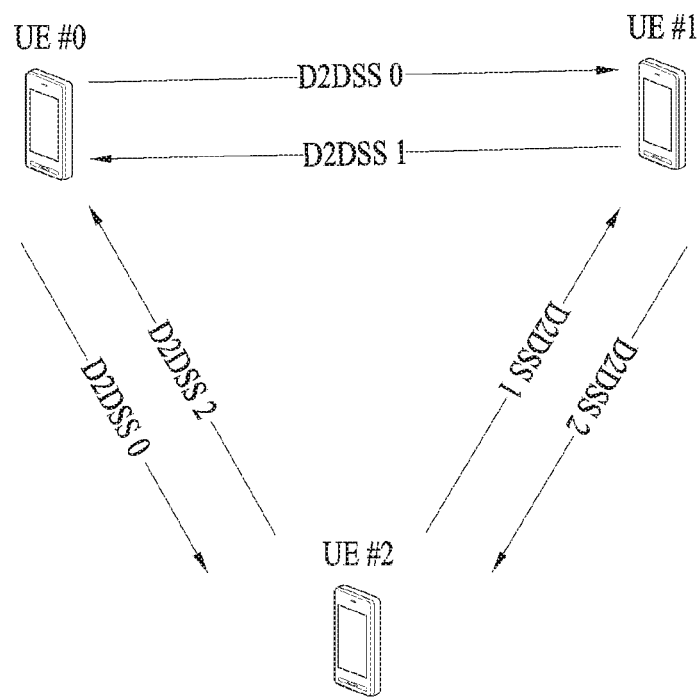

The synchronization signal transmission method of FIG. 6 has a hierarchical structure. That is, a specific UE becomes an ISS to independently decide and send a transmission time and frequency and a relay UE propagates the transmission time and frequency. In contrast, as shown in FIG. 12, an ISS may be designated using a method having a non-hierarchical structure. Resources used to transmit D2DSSs are distinguished by a hop count in the hierarchical structure, but resources used to transmit D2DSSs are distinguished by a transmission unit (TU) in the non-hierarchical structure. FIG. 13 shows an example in which D2DSSs corresponding to four TUs are time-divisionally multiplexed and transmitted on a subframe. In FIGS. 9 to 11, the method of distinguishing between D2DSS and PD2DSH resources according to hop count may be modified to a method of distinguishing between D2DSS and PD2DSCH resources according to TU in the non-hierarchical structure.

In the non-hierarchical method, a D2DSS received in an initial synchronization method is detected and in which TU the detected D2DSS is transmitted is determined. Alternatively, if the D2DSS is detected via a plurality of TUs, which D2DSS is most dominantly received is determined and time/frequency synchronization is set in the D2DSS to transmit the D2DSS. At this time, the TU of the D2DSS to be transmitted is determined by the TU of a reception D2DSS in which time/frequency synchronization will be set. In the embodiment of FIG. 13, a relationship between the TU of a dominant reception D2DSS and the TU of a transmission D2DSS may be determined in consideration of a Tx/Rx switching gap as shown in Table 1 or 2.

TABLE 1

| TU of dominant reception D2DSS | TU of transmission D2DSS |
|---|---|
| 0 | 2 or 3 |
| 1 | 3 |
| 2 | 0 |
| 3 | 0 or 1 |

TABLE 2

| TU of dominant reception D2DSS | TU of transmission D2DSS |
|---|---|
| 0 | 2 |
| 1 | 3 |
| 2 | 0 |
| 3 | 1 |

Configuration of Apparatus According to Embodiment of the Present Invention

Figure 14:
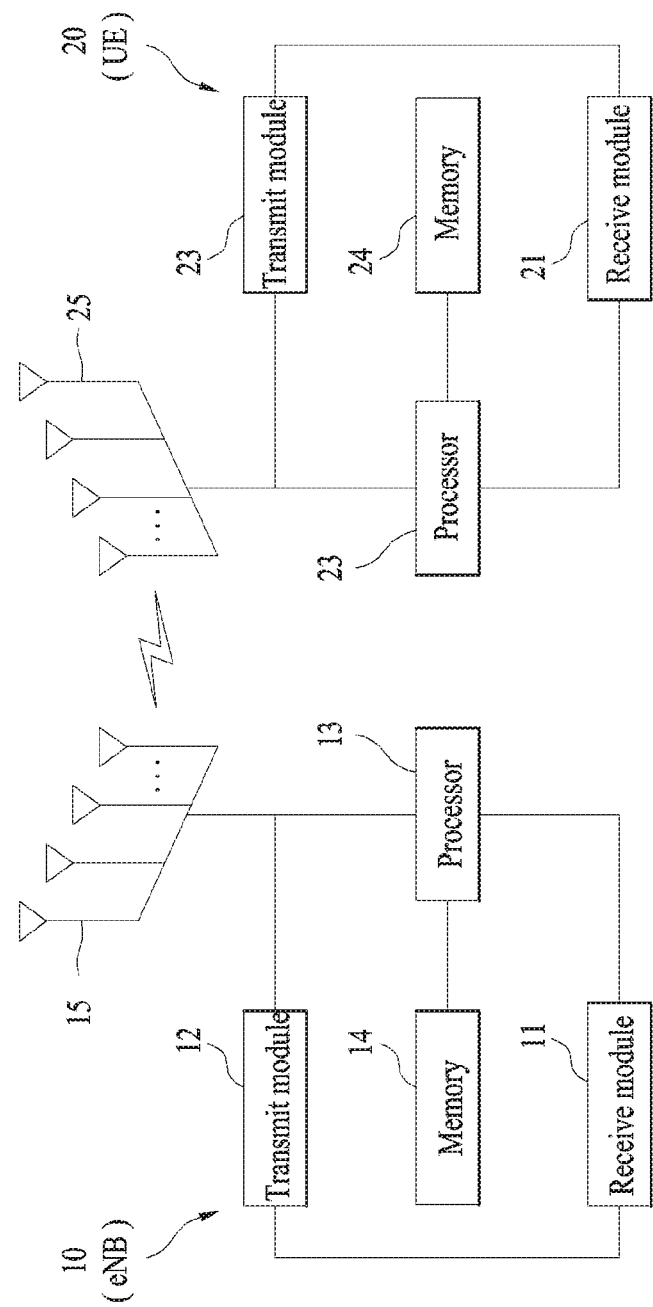
FIG. 14 is a diagram showing the configuration of transmission and reception apparatuses.

FIG. 14 is a diagram showing the configuration of a transmission point apparatus and a UE apparatus according to an embodiment of the present invention.

Referring to FIG. 14, the transmission point apparatus 10 according to the present invention may include a receive module 11, a transmit module 12, a processor 13, a memory 14 and a plurality of antennas 15. Since the plurality of antennas 15 is used, the transmission point apparatus may support MIMO transmission/reception. The receive module 15 may receive a variety of signals, data and information from the UE in uplink. The transmit module 12 may transmit a variety of signals, data and information to the UE in downlink. The processor 13 may control the overall operation of the transmission point apparatus 10.

The processor 13 of the transmission point apparatus 10 according to one embodiment of the present invention may process the operations necessary for the above-described embodiments.

The processor 13 of the transmission point apparatus 10 may process information received by the transmission point apparatus 10 and information to be transmitted to an external device and the memory 14 may store the processed information for a predetermined time and may be replaced by a component such as a buffer (not shown).

Referring to FIG. 14, the UE apparatus 20 according to the present invention may include a receive module 21, a transmit module 22, a processor 23, a memory 24 and a plurality of antennas 25. Since the plurality of antennas 25 is used, the UE apparatus may support MIMO transmission/reception. The receive module 25 may receive a variety of signals, data and information from the eNB in downlink. The transmit module 22 may transmit a variety of signals, data and information to the eNB in uplink. The processor 23 may control the overall operation of the UE apparatus 20.

The processor 23 of the UE apparatus 20 according to one embodiment of the present invention may process the operations necessary for the above-described embodiments.

The processor 23 of the UE apparatus 20 may process information received by the UE apparatus 20 and information to be transmitted to an external device and the memory 14 may store the processed information for a predetermined time and may be replaced by a component such as a buffer (not shown).

In the above-described detailed configuration of the transmission point apparatus and the UE apparatus, details of the above-described various embodiments of the present invention may be independently applied or 2 or more embodiments may be applied at the same time. In this case, overlapping details will be omitted from the description for simplicity and clarity, Furthermore, in the description of FIG. 14, the description of the transmission point apparatus 10 may also be equally applied to a device functioning as a downlink transmission entity or an uplink reception entity. The description of the UE apparatus 20 may also be equally applied to a relay station device functioning as an uplink transmission entity or a downlink reception entity.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so as to be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Additionally, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

What is claimed is:

1. A method for receiving device-to-device (D2D) control information at a user equipment (UE) in a wireless communication system, the method comprising:
receiving a subframe;
receiving a D2D synchronization signal sequence transmitted on the subframe from a base station;
deciding a hop count of the D2D synchronization signal sequence from an index of the D2D synchronization signal sequence;
deciding a transmission location of D2D control information corresponding to the decided hop count;
receiving the D2D control information from the base station at the decided transmission location,
wherein, when a transmission period of the subframe, on which the D2D synchronization signal sequence is transmitted, is predetermined, the UE transmits the D2D synchronization signal sequence once more within the transmission period,
wherein the D2D synchronization signal sequence transmitted once more is transmitted on a next subframe of the subframe, on which the D2D control information corresponding to a last hop count found in the subframe is transmitted, and
wherein a time-frequency correction value of a synchronization signal of the UE is applied to the D2D synchronization signal sequence transmitted once more.

2. The method according to claim 1, wherein the D2D control information corresponding to the hop count is transmitted by a UE which has transmitted the D2D synchronization signal sequence used to decide the hop count.

3. The method according to claim 1, wherein a time relationship between a subframe, on which the hop count is transmitted, and a subframe, on which the D2D control information is transmitted, is predetermined.

4. The method according to claim 1, wherein the transmission location of the D2D synchronization signal sequence in the subframe is set according to the hop count.

5. The method according to claim 1, wherein D2D synchronization signal sequences having different hop counts are time-divisionally multiplexed in the subframe.

6. The method according to claim 1, wherein a smallest value of hop counts of D2D synchronization signal sequences included in the subframe varies depending on whether the UE is an out-of-coverage UE.

7. The method according to claim 6, wherein, if the UE is an out-of-coverage UE, the hop count decided from the D2D synchronization signal sequences included in the subframe includes 0.

8. The method according to claim 6, wherein a largest value of hop counts decided from D2D synchronization signal sequences included in the subframe if the UE is an out-of-coverage UE is less than a largest value of hop counts decided from D2D synchronization sequences included in the subframe if the UE is an in-coverage UE.

9. The method according to claim 1, wherein the D2D synchronization signal sequence is transmitted via three OFDM symbols in the subframe.

10. The method according to claim 9, wherein the number of hop counts found in the subframe is 3.

11. A user equipment (UE) apparatus for transmitting a device-to-device (D2D) signal in a wireless communication system, the UE apparatus comprising:
a receive module; and
a processor,
wherein the processor receives a D2D synchronization signal sequence transmitted on a received subframe from a base station, decides a hop count of the D2D synchronization signal sequence from an index of the D2D synchronization signal sequence, decides a transmission location of D2D control information corresponding to the decided hop count, and receives the D2D control information from the base station at the decided transmission location,
wherein, when a transmission period of the subframe, on which the D2D synchronization signal sequence is transmitted, is predetermined, the UE transmits the D2D synchronization signal sequence once more within the transmission period,
wherein the D2D synchronization signal sequence transmitted once more is transmitted on a next subframe of the subframe, on which the D2D control information corresponding to a last hop count found in the subframe is transmitted, and
wherein a time-frequency correction value of a synchronization signal of the UE is applied to the D2D synchronization signal sequence transmitted once more.

* * * * *